United States Patent [19]

Rizika et al.

[11] Patent Number: 5,650,213
[45] Date of Patent: Jul. 22, 1997

[54] RETROREFLECTIVE COMPOSITION

[75] Inventors: Daniel J. Rizika, Cambridge; Adam W. Rizika, Boston, both of Mass.

[73] Assignee: Reflective Technologies, Inc., Cambridge, Mass.

[21] Appl. No.: 346,887

[22] Filed: Nov. 30, 1994

[51] Int. Cl.$^6$ .................... G02B 5/128; B32B 5/16
[52] U.S. Cl. .................... 428/143; 428/141; 428/149; 428/325; 428/341; 428/413; 427/163.4; 106/489; 359/538; 2/245; 442/68; 442/70; 442/72; 442/74
[58] Field of Search .................... 428/141, 143, 428/149, 325, 341, 413; 427/163.4; 106/489; 359/538; 2/245; 442/68, 70, 72, 74

[56] References Cited

U.S. PATENT DOCUMENTS

| | | | |
|---|---|---|---|
| Re. 30,892 | 3/1982 | Bingham et al. | 428/241 |
| 2,379,741 | 7/1945 | Palmquist | 88/82 |
| 2,407,680 | 9/1946 | Palmquist | 88/82 |
| 2,567,233 | 9/1951 | Palmquist | 88/82 |
| 2,592,882 | 4/1952 | Fisher et al. | 88/364 |
| 2,646,364 | 6/1953 | Porth | 117/296 |
| 2,963,378 | 12/1960 | Palmquist | 106/193 |
| 3,025,764 | 3/1962 | McKenzie | 88/82 |
| 3,099,637 | 7/1963 | Nellessen | 260/40 |
| 3,228,897 | 1/1966 | Nellessen | 260/16 |
| 3,251,704 | 5/1966 | Nellessen | 106/193 |
| 3,337,483 | 8/1967 | Searight et al. | 260/17 |
| 3,377,184 | 4/1968 | Kukoff | 117/25 |
| 3,420,597 | 1/1969 | Nellessen | 350/105 |
| 3,527,729 | 9/1970 | Blagham et al. | 260/37 |
| 3,535,019 | 10/1970 | Longlet et al. | 350/105 |
| 3,649,352 | 3/1972 | Courneya | 117/201 |
| 3,758,192 | 9/1973 | Bingham | 350/105 |
| 3,835,087 | 9/1974 | Searight et al. | 260/33.6 |
| 3,989,775 | 11/1976 | Jack et al. | 264/1 |
| 4,055,377 | 10/1977 | Erickson et al. | 350/105 |
| 4,103,060 | 7/1978 | Bingham et al. | 428/241 |
| 4,187,332 | 2/1980 | Fouche | 427/47 |
| 4,263,345 | 4/1981 | Bingham | 427/163 |
| 4,312,676 | 1/1982 | Hogseth et al. | 106/189 |
| 4,533,592 | 8/1985 | Bingham | 428/213 |
| 4,605,461 | 8/1986 | Ogi | 156/233 |
| 5,128,804 | 7/1992 | Lightle et al. | 359/515 |
| 5,200,262 | 4/1993 | Li | 428/266 |
| 5,283,101 | 2/1994 | Li | 428/141 |

*Primary Examiner*—William Watkins
*Attorney, Agent, or Firm*—Wolf, Greenfield & Sacks, P.C.

[57] ABSTRACT

A retroreflective composition of the present invention comprises non-volatile matrix material, volatile constituent, and a plurality of retroreflective microsphere beads wherein the ratio of the volume of matrix material to the volume of retroreflective microsphere beads is in the range of 75% to 185%, and is optimally suitable for use on fabrics.

9 Claims, 3 Drawing Sheets

RETROREFLECTIVE COMPOSITION

FIELD OF THE INVENTION

This invention relates generally to a retroreflective composition which comprises non-volatile matrix material, a volatile constituent, and a plurality of retroreflective microsphere beads, wherein the ratio of the volume of matrix material to the volume of retroreflective microsphere beads is in the range of 75% to 185%.

BACKGROUND OF THE INVENTION

There has been a continuing attempt to manufacture treatments for fabrics which are inconspicuous during the daytime and reflective at night. No practical or commercially useful way to provide an effective retroreflective fabric with such qualities has previously been reported.

Pedestrian activity at nighttime is increasing rapidly. Similarly, nighttime automobile activity has increased. Currently, there are no reflective materials that can be applied to garments to provide both hand comfort, breathability comfort and daytime colored appearance while brilliantly reflecting lights at nighttime.

Materials reflecting light are well known as a means of increasing the visibility of pedestrians or traffic signs to oncoming vehicle drivers or others requiring visual location of objects under conditions of reduced visibility. Previously, these materials which reflected light were in the form of strips and bands or heat transfer attached to a garment, therefore offering only a limited area of reflected light.

Retro-reflective coating compositions were taught in Palmquist et al. U.S. Pat. No. 2,963,378, and further teachings appear in Nellessen, U.S. Pat. Nos. 3,099,637, 3,228, 897, 3,420,597; Longlet et al. U.S. Pat. No. 3,535,019; Bingham U.S. Pat. Nos. 4,103,060; Re. 30,892, 4,263,345; Fouche Jr. U.S. Pat. No. 4,187,332.

However, because the existing commercial reflective treatments for garments are conspicuous in daytime, do not result in a desirable feel, do not wash well under normal conditions, and do not pass industry crock standards, few people wear such garments.

SUMMARY OF THE INVENTION

An object of the present invention is to provide a retroreflective composition for forming retroreflective substrates which possesses daytime appearance, nighttime retroreflectivity, and satisfies all of the wash, hand, and crock industry standards.

An object of the present invention is to provide a pigment to the reflective composition which will correspond to a color of a substrate or desired image, while simultaneously providing brilliant retroreflectivity and attractive daytime appearance.

Another object of the present invention is to provide a composition which can be applied to a substrate either evenly distributed over the entire surface of the fabric or in a patterned form or design. In the case of patterned garments, the colored retroreflective composition may be pigmented to impart fashionable garment colors.

Another object of the present invention is to provide a composition which provides increased area angularity of nighttime reflectivity.

Another object of the present invention is to provide a composition which can be applied to substrates in a solid or patterned form projecting a full reflective silhouette area during nighttime reflectivity. For retroreflective garments, rotary screen printing provides a technologically feasible, commercially viable, and economically efficient means of applying the current invention to fabric.

With the above and other objects in view, as will hereinafter appear, a feature of the present invention is a retroreflective composition, the composition comprising non-volatile matrix material, volatile constituent, and a plurality of retroreflective microsphere beads, wherein the ratio of the volume of the matrix material to the volume of retroreflective microsphere beads is in the range of 75% to 185%.

In accordance with a further feature of the invention, there is provided a retroreflective composition, the composition comprising a non-volatile matrix material, volatile constituent, a plurality of retroreflective microsphere beads, and pigment particles, wherein the ratio of the volume of the matrix material to the volume of retroreflective microsphere beads plus pigment particles is in the range of 50% to 185%.

In accordance with a further feature of the invention, there is provided a fabric which has the appearance of being more retroreflective at night than when exposed to ambient or diffuse light, the fabric having applied on at least a portion of a surface thereof a coating layer, the coating layer comprising: non-volatile matrix material, volatile constituent, and a plurality of retroreflective microsphere beads, wherein the ratio of the volume of the matrix material to the volume of retroreflective microsphere beads is in the range of 75% to 185%.

In accordance with still a further feature of the invention, there is provided a fabric which has the appearance of being more retroreflective at night than when exposed to sunlight, the fabric having applied on at least a portion of a surface thereof a coating layer, the coating layer comprising: non-volatile matrix material, volatile constituent, a plurality of retroreflective microsphere beads, and pigment particles, wherein the ratio of the volume of the matrix material to the volume of retroreflective microsphere beads plus pigment particles is in the range of 50% to 185%.

In accordance with yet a further feature of the invention, there is provided a method for treating a fabric with retroreflective composition comprising the steps of: combining a volatile constituent with a non-volatile matrix material to form a coupler compound, adding retroreflective microsphere beads to the coupler compound to form a retroreflective composition, and applying the retroreflective composition to a fabric using a rotary screen printer.

The above and other features of the invention, including various novel details of construction and combinations of parts, will now be more particularly described with reference to the accompanying drawing.

DESCRIPTION OF THE PARTICULAR EMBODIMENTS

Prior to describing the invention in detail, the following definitions are set forth to facilitate the understanding of the present invention.

A. "Daytime Unnoticeability" refers to the reduced ability of a human eye to detect the retroreflective composition on a surface of a substrate and the increased ability to detect the appearance of the pigment particles during the period between sunrise and sunset, and while indoors under illuminated conditions. The reduced ability to detect the retroreflective composition during the daytime particularly references a light source of diffuse origin; even in the daytime a beam of focussed light will provide retroreflectivity.

B. "Nighttime" refers to the period of time before sunrise and after sunset, or low illuminated indoor conditions.

C. "Retroreflectivity" refers to the reflecting rays of light which are returned in directions close to the opposite of the direction of the incident rays (e.g. along their originating path) with this property being maintained over wide variations of the direction of incident rays.

D. "End Use Product" refers to a substrate coated with the reflective composition of the present invention for use on a consumer product.

E. "Garment" refers to anything that is worn on the body of a human or animal.

F. "Crock Standard" refers to the standard American Association of Textile Chemists and Colorists (AATCC) Crockmeter Method used in the industry to measure the amount of colorant which is transferred from the surface of a colored fabric to another surface, principally by rubbing.

G. "Crock Reflectivity Loss" refers to the percentage of reflectivity lost when the AATCC Crockmeter Method is applied to the substrate.

H. "Laundering Standard" refers to the standard AATCC standardization of Home Laundry Test Conditions used in the industry to measure the amount of colorant which is lost as a result of one to fifty wash/dry cycles. This test has been adapted to also measure the amount of reflectivity which is lost as a result of one to fifty wash/dry cycles.

I. "Hand Standard" refers to the standard AATCC subjective evaluation of fabric hand test method used in the industry to measure the tactile qualities of a fabric. The tactile qualities of a fabric include the softness, drape, flexibility, firmness, elasticity, fineness, resilience and other qualities perceived by touch.

J. "Microsphere beads" are beads having a diameter of 20 to 200 microns. In a particular embodiment, the beads are constructed of glass and have a diameter of approximately 50 microns. The microsphere beads have an index of refraction ranging from 1.7 to 2.5, subject to the desired use, and may be clear or colored.

K. "Retroreflective means" refers to the metallic material, such as aluminum or, non-metallic material, such as organic compounds, which coats the microsphere bead to enable the microsphere bead to be retroreflective.

L. "Hemispherical retroreflective means" refers to the retroreflective means which covers approximately one half of the microsphere bead's surface area.

M. "Retroreflective Microsphere Beads" refers to the microsphere beads having Retroreflective Means applied thereon.

N. "Randomly Oriented" refers to the orientation of retroreflective microsphere beads upon application to a substrate. When retroreflective microsphere beads are applied to a substrate, they randomly orient themselves with respect to the plane of its surface, providing for retroreflection at a wider range of angles.

O. "Substrate" refers to the base material which is to be coated or printed. Examples of base material include, but are not limited to, textiles, fabric, paper, leather, plastic, glass, metals, wood, rubber, synthetic rubber, composites, and other materials.

P. "Matrix Material" is a transparent or translucent non-volatile film-forming emulsion. The matrix material serves to bind pigment particles and microsphere beads to a substrate. For textile substrates, matrix materials include, but are not limited to acrylic, vinylidene chloride, butadiene, acrylonitrile or urethane polymers, or any of these combinations. For other substrates, matrix materials include, but are not limited to oils, resins, solvents or any combination.

Q. "Volatile Constituent" refers to a liquid component of the present invention conducive to evaporation.

R. "Coupler Compound" refers to the combination of the volatile constituent and the non-volatile matrix material. Additional ingredients, including but not limited to, dispersant, thickener, defoamer, fixer and ammonium hydroxide may be added to the coupler compound to facilitate application to a substrate.

S. "Pigment Particle" refers to a colored or non-colored particulate solid which is insoluble in, and essentially physically and chemically unaffected by, the vehicle in which they are incorporated.

T. "Matrix Material Layer" refers to the layer of matrix material which, upon treatment of a substrate, forms on a surface of the substrate upon the evaporation of the volatile constituent from the coupler compound. Upon application to a substrate, the matrix material layer has a thickness of less than one half of the diameter of a microsphere bead. In a particular embodiment, the matrix material forms a layer between the surface of the substrate and the microsphere bead having a thickness of less than one quarter of the diameter of a microsphere bead. This matrix material layer provides a vehicle in which the pigment particles are maintained, and provides both a layer into which the retroreflective microsphere beads are embedded and/or a surface by which the retroreflective microsphere beads may be covered. Achieving this matrix material layer is a result of both the ratio of matrix material to microsphere beads, or matrix material to microsphere beads plus pigment, and from properly controlling the application variables (e.g. viscosity of the coupler compound, application speed, application pressure, and the drying/curing process).

U. "Rotary Screen Printing" refers to the printing process in which a perforated cylindrical screen is used to apply the coupler compound onto a substrate. The coupler compound is pumped into the inner portion of the screen and forced out onto a substrate through the tiny screen perforations (typically in the form of an image). Numerous variables exist in rotary screen printing which may be altered to obtain the desired deposit of the coupler compound and thus achieve the matrix material layer onto a given substrate. These variables include, but are not limited to, the speed at which the substrate is printed, the pressures used to force the coupler compound through the screen, the screen type and mesh size, the viscosity of the coupler compound, the percent of non-volatile substances within the coupler compound, the drying temperature, and the length and type of dryer.

V. "Semi-Saturated Microspheric Density" refers to the number of retroreflective microsphere beads per unit of area required to be deposited on the substrate to yield daytime unnoticeability and nighttime retroreflectivity of the resulting substrate.

The highest density of microsphere beads that can be attained in a given one dimensional space is 90.69%. The actual number of microsphere beads in a one dimensional space depends on the diameter of the microsphere beads. The optimum microsphere size to achieve the highest retroreflectivity and daytime unnoticeability, and for obtaining optimum coatability, dispersion and suspension in the matrix material is approximately 50 microns in diameter. A micron is a thousandth of a millimeter. At 50 microns, the maximum number of microspheres which may be deposited in a matrix material layer is approximately 46,000 microsphere beads per square centimeter.

W. "Multi-Tiered Microspheres" refers to the structure of microsphere beads which results from the semi-saturated microspheric density of the present invention. Specifically, when approximately 2,000 to 20,000 microsphere beads are deposited onto a square centimeter of fabric, a portion of the microsphere beads will tend to gather on the upper surfaces of the lower lodged retroreflective microsphere beads and subsequently group together to form multiple layers of retroreflective microsphere beads, or multi-tiered microsphere beads.

X. "Detectability" refers to the characteristic of an object that determines the likelihood that the object will be visible to an observer. For example, when a driver is approaching a sign, the sign will become detectable when the driver's eyes are first capable of seeing it. However, at this point the driver may not have noticed the sign and will not have registered that he is viewing it.

Y. "Conspicuity" refers to the characteristic of an object that determines the likelihood that the object will come to the attention of the observer. Since one's eyes continuously detect millions of objects, conspicuity implies that the mind has registered the importance of this object and begun to consider it.

Z. "Recognizability" refers to the characteristic of an object that determines the likelihood that the object will be recognized by an observer. Upon recognition of an object, the motorist can determine whether it is worthy of potential action by identifying whether the object is a sign, another automobile, a person, an animal, or something else.

AA. "Localizability" refers to the characteristic of an object that determines the likelihood an observer will be able to determine the object's location. Localizability enables a driver to judge the size and position of the object to determine whether the object appears capable of intersecting with the vehicle's path (by mentally judging the closing rate, necessary deceleration, and lateral offset).

AB. "Candelas" is a unit of luminous intensity equal to one sixtieth of the luminous intensity of one square centimeter of a blackbody surface at the solidification temperature of platinum. The candela is used for the measurement of retroreflectivity, i.e., candelas per lux per square meter, or candelas per lux per end use product.

AC. "Reflectivity per area ratio $(R_A)$" is a ratio that represents the degree of retroreflectivity of a substrate upon which retroreflective microsphere beads are deposited. The ratio is dependent upon the angle between the light source, the substrate and the observer. The ratio can be measured in the units of candelas per lux per meter squared.

AD. "Reflectivity per End Use Product $(R_{eup})$" is a ratio that represents the retroreflectivity of a specific end use product. The measurement is an average of the retroreflectivity of the end use product measured at each orientation as the end use product is rotated in 15% increments. This test has been modified from the standard ASTM industry test. This ratio is calculated from the average of the ratios measured at a distance of both 70 meters and 230 meters between the observer and the end use product, and can be measured in units of average candelas per lux per end use product.

Figure 1:
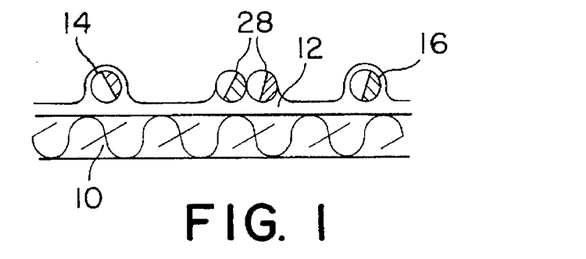
FIG. 1 is a cross sectional view of the retroreflective composition manufactured according to the present invention.

Referring to FIG. 1, upon application to a substrate 10, a matrix material 12 has a plurality of microsphere beads 14, coated with hemispherical retroreflective means 16, partially embedded therein.

In a one particular embodiment, the microsphere beads have an average diameter within the range of 25 to 75 microns. The optimum size of the microsphere beads to achieve the highest retroreflectivity and daytime unnoticeability is 50 microns diameter. If the average bead size exceeds 100 microns, the flexibility, launderability, handling, daytime unnoticeability, and crock standards are impaired.

In certain embodiments, the microsphere beads having hemispherical reflective means coated thereon have a refractive index of approximately 1.9 to provide efficient retroreflectivity and daytime unnoticeability. The 1.9 refractive index provides such retroreflectivity and daytime unnoticeability when the retroreflective microsphere beads are viewed under normal dry conditions. The optimum value for the refractive index of retroreflective microsphere beads is approximately 2.5 when the retroreflective microsphere beads are covered with water.

The retroreflective means is applied to the microsphere beads by the following process: A carrier web is first coated with a layer of adhesive in which the microsphere beads are removably embedded in a position adjacent to the surface of the carrier web, the adhesive should be capable of being dissolved at a later stage. The adhesive binder may be applied to the carrier web by screen printer, blade, rod, roller, direct gravure, spray or any method that is suited to laying down a specific quantity of adhesive over a defined area. The adhesive binder should be deposited to leave a thickness of approximately 50% of the diameter of the microspheres when the adhesive is dried, and as such the deposit should allow for the evaporation of the solvent content of the adhesive when the drying process takes place.

The adhesive is applied to the carrier web dried until it becomes sufficiently tacky, at which time the microsphere beads are deposited on the web. The microsphere beads should be applied over the maximum possible area and should be embedded to approximately half their diameter in the temporary binder. The spheres may be distributed over the surface area by cascading, sifter or hopper onto the wet adhesive binder.

The carrier web may then be passed through pressure rollers to ensure that the microsphere beads are securely embedded in the adhesive and are located adjacent to the carrier web surface. The rollers also press any loose spheres into any spaces to ensure the maximum coverage, to achieve a monolayer of spheres over the total surface area of the carrier web. Excess microspheres may be removed by brushing or suction. The coated carrier web is then passed through an oven or drying facility to activate the adhesive binder and/or to further drive off the solvent content of the adhesive.

The coated carrier web is then passed through a region of a high vacuum deposition chamber wherein a layer of retroreflective means is deposited over the exposed hemispheres of the microsphere beads. High vacuum deposition procedures and application methods concerning this process are well known. An aluminum deposit of approximately 50 to 250 Angstroms is sufficient to provide an opaque deposit with good reflecting properties.

MBVC and MBPVC ratios

In one embodiment, in order to achieve the required properties when coating a substrate with the retroreflective composition of the present invention, it is necessary to maintain a relationship of volume ratios of discrete insoluble particles within the composition. This critical volume ratio is independent of any volatile content in the composition, for it is only the non-volatile ingredients which remain in a substrate after evaporation of the volatile ingredients. Further, among the non-volatile ingredients, only the matrix material, the retroreflective microsphere beads, and the pigment particles compose the retroreflective composition having the volume ratio identified above. Other volatile and non-volatile components of the composition relate solely to the printing ability and quality of the composition when applied to a substrate. These include ingredients such as a dispersant, a thickener, a defoamer, a fixer and ammonium hydroxide. Thus, the volume ratio described according to the present invention relates solely to the volume of matrix material, retroreflective microsphere beads and pigment particles.

A useful concept to describe this volume ratio requirement is Matrix to Bead Volume Concentration (hereinafter referred to as "MBVC"). The MBVC ratio represents the relationship of the volume of the matrix material to the volume of retroreflective microsphere beads. The present invention provides for a MBVC between 75% and 185% to gain the nighttime reflectivity, daytime unnoticeability, hand comfort, breathability comfort and to pass the industry standards heretofore described.

With a MBVC ratio below 75%, the quantity of matrix material in the composition is insufficient to anchor the discrete retroreflective microsphere beads to the substrate. Further, with a MBVC ratio below 75%, there is insufficient matrix material to ensure that the substrate coated with such composition will satisfy industry standard crock, laundering, and crock reflectivity loss tests. With a MBVC ratio above 185%, the quantity of matrix material exceeds acceptable hand standards. In a specific embodiment, the MBVC ratio is maintained between 100% to 130%. This MBVC ratio provides for the optimal amount of matrix material to microsphere beads needed to practice the present invention.

With the inclusion of pigment particles, the volume ratio requirement of the present invention is referred to as the Matrix Material to Bead+Pigment Volume Concentration (hereinafter referred to as "MBPVC"). The MBPVC ratio represents the relationship of the volume of matrix material to the volume of retroreflective microsphere beads plus pigment particles. The present invention provides for a MBPVC between 50% and 185% to gain the nighttime reflectivity, daytime unnoticeability, hand comfort, breathability comfort and to pass the industry standards heretofore described. The disadvantages of a ratio below 50% and above 185% are analogous to that described above with regard to the MBVC ratio. It has been discovered that with approximately a 1:1.2 MBPVC ratio, the matrix material will achieve the following:

1. Provide a thin matrix material layer that does not interfere with a source of light reaching the back surface of the microsphere beads upon which the retroreflective means is coated. When the layer of matrix material, through which a source of light must pass, is thick, the beam of light will be refracted, thus preventing an adequate retroreflection of light.

2. Supply a sufficient amount of matrix material to insure the retroreflective microsphere beads are secured firmly to the substrate. This feature is evidenced by satisfying industry crock, laundering and crock reflectivity loss standards.

3. Prevent the creation of additional extraneous matrix material which results in poor tactile qualities of the substrate;

4. Provide a vehicle in which the pigment particles may be uniformly embedded to provide sufficient pigment particle coverage over the entire surface area of the desired portion of the substrate.

To minimize the amount of the matrix material on a substrate, and to provide increased fluidity of the matrix material, a volatile constituent is added to the matrix material to form the coupler compound. As previously noted, other optional ingredients may be added to the coupler compound to facilitate application to a substrate. The volatile constituent comprises in the range of 50 to 90 volume-percent of the coupler compound. In one embodiment, the volatile constituent is water and comprises approximately 65% volume percent of the coupler compound of the present invention.

Figure 2:
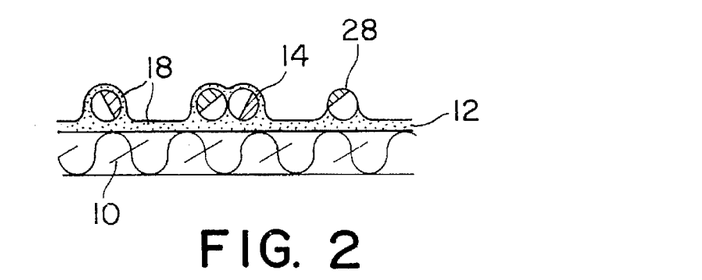
FIG. 2 is a cross sectional view of the retroreflective composition containing pigment manufactured according to the present invention.

Upon formation of the coupler compound, the retroreflective microsphere beads are added to the coupler compound to form the retroreflective composition of the present invention. The retroreflective composition is then applied to a substrate and cured. Upon evaporation of the volatile constituent, the matrix material forms a matrix material layer into which the retroreflective microsphere beads are embedded and may be covered. As shown in FIGS. 1 and 2, microsphere beads 28 are not covered with the matrix material layer. As noted above, in one embodiment, the matrix material layer has a thickness of less than one quarter of the diameter of a microsphere bead between the surface of the substrate and the microsphere bead.

As noted, a variety of optional ingredients may be included in the coupler compound to achieve desired results. For example, antifoaming agents may be included in the coupler compound to minimize foaming of the compound as it is being formulated or when it is applied to a substrate. In addition, adhesion promoters may be included in the coupler compound. Adhesion promoters include, but are not limited to, titanates, organofunctional silanes, zirconates, zircoaluminates, alkyl phosphate ester, and chartwell. Examples of silanes include, but are not limited to, gamma-Glycidoxypropyltrimethoxysilane, gamma-Aminopropyltriethoxysilane and gamma-Aminopropyltrimethoxysilane. Further, softeners may be included in the coupler compound. Softeners improve the hand of the fabric by offsetting the harshness of the microsphere beads and the pigment particles. Examples of softeners include, but are not limited to, low, medium and high density polyethylene, polydimethylsiloxane mixture, and reactive and elastomeric silicone.

Further, dispersants may also be included in the coupler compound. Examples of dispersants include, but are not limited to, tymol dispersant, acrylic polymers, and naptholene sulphantes. Thickeners may be included in the coupler compound. Examples of thickeners include, but are not limited to, acrylic polymers, natural gums, alginates, and white spirit. Fixers may be included in the coupler compound. Examples of fixers include, but are not limited to, methylated melamine formaldehyde, and DMDHEU.

In one embodiment of the invention, an adhesion promoter is coated onto the individual retroreflective microsphere beads prior to the inclusion of the retroreflective beads into the coupler compound to form the reflective composition of the present invention. To gain optimal adhesion, the adhesion promoter constitutes between approximately 0.05% and 1% of the bead weight, depending upon the surface area of the retroreflective microsphere bead.

The relative amounts of the ingredients of the retroreflective composition of the present invention will, of course, vary depending upon the particular ingredients employed, the type of substrate, the substrates intended use, as well as such factors as the specific size and quantity of the retroreflective microsphere beads.

Numerous tests have been performed on the substrate coated with the retroreflective composition of the present invention. As shown below in Table 1, garments having the retroreflective composition of the present invention applied thereon were laundered 20 times and found to show a retention of approximately 90% or more of their initial reflectivity. The entire surface area of a fabric may be treated with the retroreflective composition of the present invention to project a full reflective silhouette and still maintain its original daytime unnoticeability and tactile qualities. In addition, the test results shown in Table 1 depict the dry and wet crock tests, the dry and wet crock reflective loss tests, both of which are provided by the industry, and the softness and drape of the substrates coated with the retroreflective composition of the present invention. The tests were conducted on a scale of 1 to 5. The results depict the average score obtained with 5 individuals performing the test.

Pigment Diameter

Pigments are well known in the art. In particular, synthetic pigments are commonly available in several grades or size ranges. In the practice of the present invention, the pigment particles have a diameter of less than 2 microns. Preferably, a pigment particle has a diameter of less than 1 micron. Pigment particles less than 1 micron will uniformly coat the substrate in a continuous manner. The small size of the pigment particle enables the pigment to bond directly to the substrate. A pigment particle with a diameter of less than 2 microns, which is substantially smaller than the size of the microsphere beads of the present invention, does not deter retroreflection at nighttime and enhances daytime unnoticeability, while providing flexibility, and passing crock, launderability, and crock reflectivity loss industry standards.

Specifically, in the embodiment as shown in FIG. 2, pigment particles 18 having a maximum dimension size of less than 2 microns enable the pigment particles 18 to flow evenly throughout the entire surface area of the matrix material 12. The pigment particles 18 are enabled to lodge on top of, adjacent to, and beneath retroreflective microsphere beads 14. The advantage of this pigment particle placement is that the daytime unnoticeability is enhanced by the uniformity which will necessarily occur upon the application of the retroreflective composition to a substrate. Further, in contrast to large pigment particles which attach to fibers in a discrete manner, the pigment particles of the present invention attach to fibers in a continuous fashion. Further, since the volume of the matrix material is approximately equal to the volume of the pigment plus the retroreflective microsphere beads, the volume of the less than 2 micron diameter sized pigment particles is sufficiently small as to not interfere with the flexibility, wearability, breathability, and crock, launderability, crock reflectivity loss industry standards, while requiring a small volume of matrix material to adhere them to the substrate.

Further, with a pigment particle having a diameter of less than 2 microns, the microsphere of 50 microns will not

TABLE 1

| Substrate | Pigment color | Dry Crock | Wet Crock | 20 wash loss Laundering | Dry crock Reflect. loss | Wet crock Reflect. loss | Softness | Drape |
| --- | --- | --- | --- | --- | --- | --- | --- | --- |
| 5.0 oz supplex; 65% coverage | Blue | 3.5 | 4.0 | 0% | 0 | 0 | 3.0 | 3.0 |
| 4.5 oz supplex; 100% coverage | Violet | 4.0 | 3.0 | 0% | 0 | 4% | 4.0 | 3.0 |
| 3.0 oz supplex; 100% coverage | Blue | 4.0 | 4.5 | 0% | 0 | 4% | 4.0 | 3.0 |
| 100% cotton; 20% coverage | Yellow | 5.0 | 4.5 | 0% | 0 | 0 | 4.0 | 4.0 |
| Codura; 100% coverage | Green | 4.0 | 3.0 | 50% | 1 | 5 | 4.0 | 4.0 |
| Synthetic leather; 100% coverage | Violet | 4.5 | 4.5 | 15% | 9 | 17 | 4.0 | 5.0 |

In FIG. 2, both retroreflective microsphere beads 14 and pigment particles 18 are applied to the coupler compound to form the retroreflective composition of the present invention. The pigment particles 18 have a diameter of less than 2 microns. In some embodiments, the MBPVC is approximately 120%.

The pigment particles may be numerous colors. In one embodiment, the pigment particles are blue, and comprise copper phthalocyanine blue, indanthrone blue, or carbazole violet. In another embodiment, the pigment particles are yellow, and comprise monoarylide yellow, (i.e. pigment yellow 1 (Hansa Yellow G), pigment yellow 65, pigment yellow 73, pigment yellow 74) diarylide yellow, benzimidazolone yellow, or heterocyclic yellow. Transparent pigment particles, as compared to opaque pigment particles, yield improved retroreflectivity under nighttime conditions.

prevent any of the pigment particles from entering and adhering to the matrix material. Thus, even if two microsphere beads of 50 microns are adjacent to each other, the pigment particles will have sufficient space within which to lodge in between the microsphere beads, or gather below and/or on the top surface of the microsphere beads, to provide sufficient pigment throughout the substrate's surface. If the pigment particles were larger than 2 microns, there is a danger that the pigment particles would only remain in the matrix material provided there was sufficient room between microsphere beads to allow the pigment particles to pass through, or if the microsphere beads were sufficiently close to each other, to provide a support surface on which to deposit the pigment particles. However, in the latter case, a pigment particle having a size greater than 2 microns would interfere at nighttime with a light source from contacting the microsphere bead, and also prevent the return of the retroreflective rays. With pigment particles less than 2 microns, the pigment particles do not interfere with the retroreflective properties taught by this invention.

Figure 3:
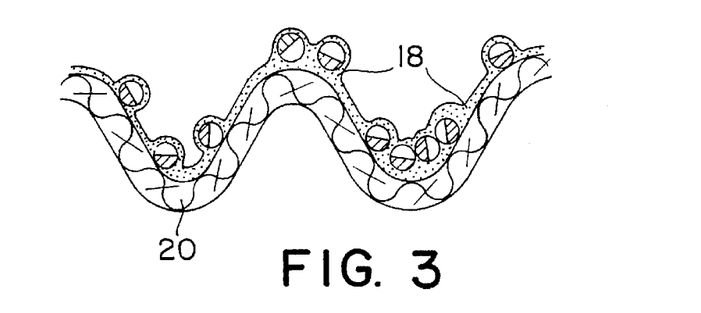
FIG. 3 is an enlarged cross sectional view of the fabric treated with the composition of the present invention.

As shown in FIG. 3, with pigment particles 18 less than 2 microns, the pigment particles 18 provide continuous coverage throughout the entire surface of a fabric 20, regardless of the indentations and ridges inherent in the fabric due to its construction. The retroreflective composition may be applied to a fabric over its entire surface or in a pattern form (not shown). By applying the retroreflective composition to a continuous bolt of fabric, this fabric can then be cut and sewn into a garment. Articles of clothing which may be coated with the retroreflective composition of the present invention include, but are not limited to, socks, sneakers, shoes, shoelaces, boots, pants, shorts, shirts, coats, hats, belts, scarves, gloves. In some embodiments, the fabric on which the retroreflective composition is applied includes, but is not limited to, nylon, cotton, polyester, lycra, leather, and synethics.

Multi-Tiered Microspheres

To ensure that fabrics were coated with a sufficient amount of retroreflective composition of the present invention required to provide enhanced safety, nighttime driving tests were undertaken. These nighttime tests were designed and conducted similar to those undertaken by The American Society for Testing and Materials (ASTM) Committee on High Visibility Materials For Individual Safety, with the goal of determining the reflectivity per garment necessary to enhance motorist awareness of a pedestrian.

Garments were assessed using four important criteria identified by the ASTM for enhanced visibility. These four criteria include: detectability, conspicuity, recognizability, and localizability. These criteria are based on the physiological visual responses that a driver requires to perceive and respond to a potential hazard. Thus, the process by which the eye, brain, and body react to a potentially hazardous situation can be characterized through the four previously mentioned criteria. It is important to recognize that unlike garments using traditional retroreflective strips, a garment that reflects a full silhouette provides additional conspicuity, recognizability, and localizability.

Tests were conducted under two sets of road conditions representing lighted streets and dark streets, the results of which are shown below in Table 2. Fabrics treated with the retroreflective composition of the present invention were viewed at 70 meters and 230 meters using low beams of a standard automobile. The tests were conducted on a scale of 1 to 5. A "1" represents that the substrate could not be viewed. A "5" represents that the substrate was clearly luminous and recognizable. The results depict the average score obtained with 5 individuals performing the test. Further, the test results presented below in Table 2 show that fabrics having a reflectivity per end use product (hereinafter referred to as "$R_{eup}$") greater than 0.10 candelas per garment enhanced pedestrian safety under low-beam driving conditions (low beam driving conditions were used as a standard because over 90% of nighttime driving is estimated to be done using low beams).

TABLE 2

| Substrate | Pigment color | Dark road 70 meters | Dark road 230 meters | Lighted road 70 meters | Lighted road 230 meters | Reup CVlux/eup | Ra CVlux/m^2 |
| --- | --- | --- | --- | --- | --- | --- | --- |
| 5.0 oz supplex; 65% coverage | Blue | 5.0 | 4.5 | 3.1 | 1.6 | 0.5 | 8.0 |
| 4.5 oz supplex; 100% coverage | Violet | 5.0 | 4.8 | 3.9 | 2.8 | 1.6 | 19.5 |
| 3.0 oz supplex; 100% coverage | Blue | 5.0 | 4.7 | 2.6 | 3.7 | 1.1 | 13.3 |
| 100% cotton; 20% coverage | Yellow | 4.8 | 4.4 | 1.5 | 2.5 | Not Performed | 13.5 |
| Codura; 100% coverage | Green | 3.5 | 2.5 | Not Peformed | Not Performed | Not Performed | 19.4 |
| Synthetic leather; 100% coverage | Violet | 3.8 | 2.7 | 1.0 | 1.8 | Not Peformed | 10.4 |

To achieve this level of reflectivity per garment (0.10 candelas per lux per garment), the retroreflectivity per area of the fabric used (hereinafter referred to as $R_a$) must be greater than 3.0 candelas per lux per square meter of treated surface. This level of reflectivity can be achieved by applying a minimum of 2,000 microspheric beads per square centimeter. Thus, a minimum amount of retroreflective microsphere beads required to enhance nighttime visibility was determined.

Further, the retroreflectivity of the substrate must not be increased to the extent that the retroreflective microsphere beads provide a silvery or colored appearance on the substrate during daytime viewing conditions. To assess this requirement, daytime appearance tests were performed. It was determined that a maximum of 20,000 microspheric beads per square centimeter applied to the matrix material provided the maximum degree of daytime unnoticeability of the substrate. This correlates to a retroreflectivity per area of 45 candelas per lux per square meter, and a retroreflectivity per end use product of less than 4.0 candelas per lux per garment.

As a result a trade-off must be made for each individual fabric type depending on its intended use. The density, or number of microsphere beads per square centimeter, determines both the degree of retroreflectivity and the degree of daytime unnoticeability of the substrate. For use in the present invention, the optimal number of retroreflective microsphere beads per square centimeter of treated fabric, or the semi-saturated microspheric density of treated fabric is between 2,000 and 20,000. A semi-saturated microspheric density of between 2,000 and 20,000 results in a retroreflectivity per area of 3 to 45 candelas per lux per square meter, and in retroreflectivity per garment of 0.10 to 3.00 candelas per lux per jacket.

Figure 4:
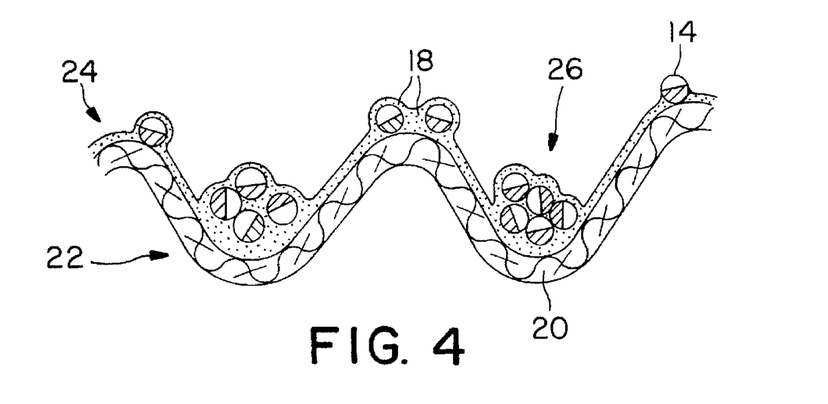
FIG. 4 is an enlarged cross sectional view of the fabric treated with the composition of the present invention in which multiple layers of microsphere beads have been applied.

As shown in FIG. 4, fabric 20 does not provide a flat surface by which a light ray will be reflected, but rather has indentations 22 and ridges 24 due to its construction, i.e. weave or knit. Specifically, when approximately 2,000 to 20,000 microsphere beads are deposited onto a square centimeter of fabric, the majority of microsphere beads will lodge into the recesses of the fabric; the minority of microsphere beads will lodge on the uppermost portion of the fabric (where they are at higher risk of being rubbed off during normal wear/washing). It has been discovered that on certain substrates, particularly substrates having indentations, microsphere beads having a semi-saturated microspheric density, will tend to gather on the upper surfaces of the lower lodged retroreflective microsphere beads and subsequently group together to form multiple layers of retroreflective microsphere beads, or multi-tiered microsphere beads.

Figure 5:
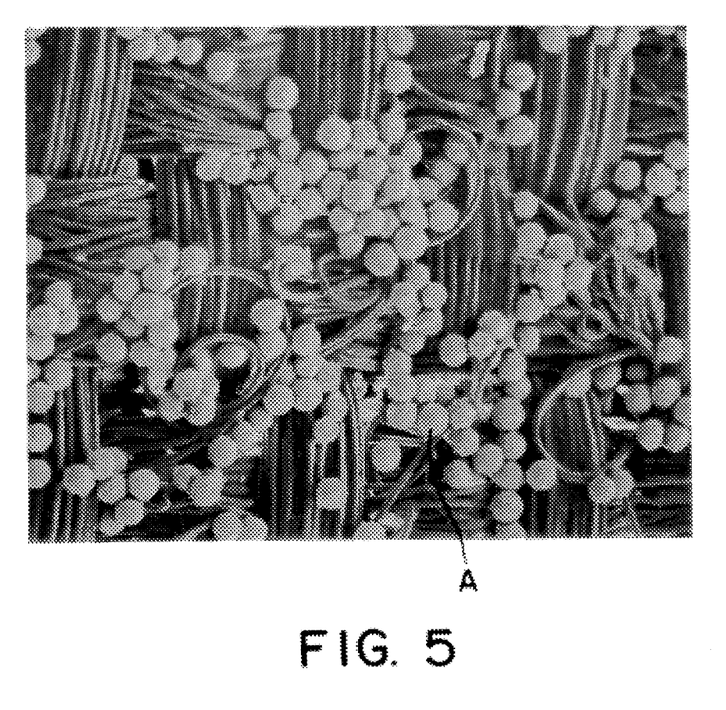
FIG. 5 is a scanning electron microscope photograph of a fabric treated with the composition of the present invention.

This effect is also illustrated at region A of FIG. 5. FIG. 5 is a scanning electron microscope photograph of a nylon fabric treated with the composition of the present invention. The advantages of multi-tiered microsphere beads as formed by the current invention are that they improve overall reflectivity of the substrate while maintaining desired levels of daytime unnoticeability. In some embodiments, 10% to 50% of the beaded substrate surface has formations of 2 to 3 layers of microspheres. Actual percentage varies with type of substrate used. FIG. 5 shows a portion of a nylon fabric 450 microns in height by 575 microns in width, with 163 retroreflective microsphere beads contained therein. The semi-saturated microspheric density of this fabric is approximately 6,300 retroreflective microspheric beads per square centimeter.

In one embodiment of the present invention, as shown in FIG. 4, the multi-tiered microspheres deposit in the recesses 26 of the fabric. However, since reflectivity depends largely on the orientation of the retroreflectively coated microsphere beads, the multi-tiered microsphere beads which are randomly oriented increase the likelihood that a beam of light will be reflected back to its source. Further, the ability of the less than 2 micron diameter pigment particles to lodge themselves in the crevices and surface area of the matrix material assists in the daytime unnoticeability of the retroreflective composition. In one embodiment, the retroreflective composition is applied to absorbent fabric to further increase adherence to the fibers.

The small size of the retroreflective microsphere beads coupled with the multi-tiered microsphere beads assist in preventing the observer's eyes from resolving the silvery or colored retroreflective means coated on the microsphere beads under daytime viewing conditions. Rather, the observer sees the surface area of the matrix material interposed between the retroreflective microsphere beads. This surface area predominantly includes the pigment particles. Thus, the retroreflective composition achieves its daytime unnoticeability to enable an observer to see only the color of the pigment on the substrate. This effect is primarily achieved because the retroreflective microsphere beads having an index of refraction of approximately 1.9 is viewed by diffused light during the day. Thus, only a small proportion of these diffuse light rays which impact the retroreflective microsphere beads are directed in the proper direction to be reflected at the back surfaces of the retroreflective microsphere beads so as to reach the observer's eyes. Only those rays which are incident in paths close to the observer's line of sight will be viewed. The incident light rays striking the outer exposed surfaces of the matrix material are largely absorbed by the pigment particles in the matrix material.

However, when viewed at nighttime, there is minimum diffuse light directed on the substrate. Rather, at nighttime, there are focussed illuminating rays, such as headlights or flashlights, directed at the substrate. These rays are incident in substantially the same direction as the observer's line of sight. As a result of these focus incident rays, a brilliant silvery or colored reflection occurs for those rays striking the retroreflective microsphere beads. The intensity drowns out the effect of the exposed surface area of the matrix material. The substrate appears as though it is fully coated with a brilliant silvery or colored paint. Thus, the difference in day and night appearances result from the optical effects produced by the retroreflective composition of the present invention.

Figure 6:
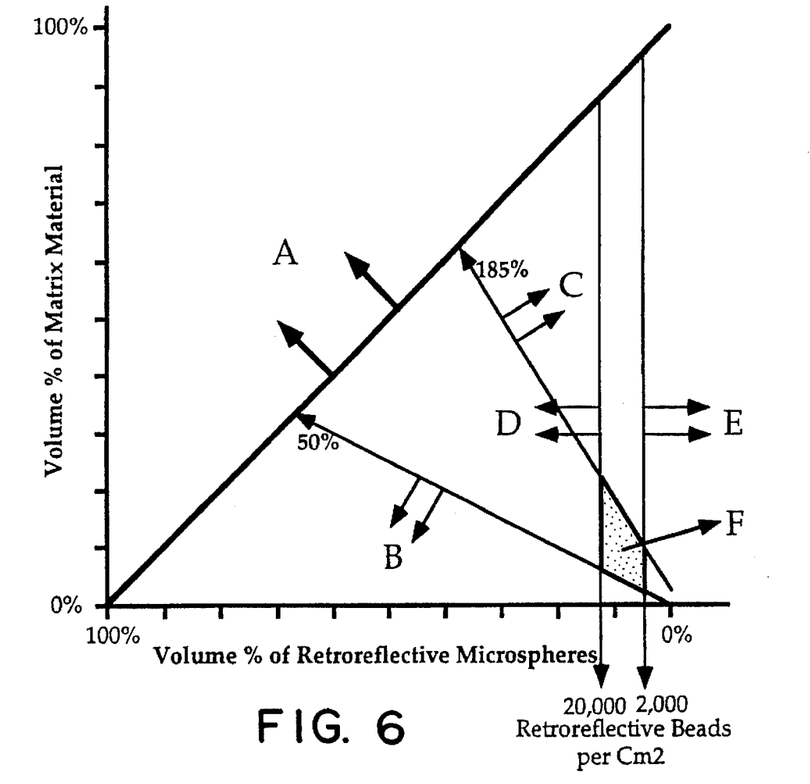
FIG. 6 is a graph depicting the volume percent of matrix material with the volume percent of retroreflective microsphere beads of the present invention.

FIG. 6 is a graph showing the volume percent of matrix material with the volume percent of retroreflective microsphere beads. The area marked as F represents the range in which a retroreflective composition of the present invention can be applied to a substrate to achieve a semi-saturated microspheric density of between 2,000 and 20,000, as well as satisfy industry crock, crock reflective loss, laundering, and hand standards.

Area A of FIG. 6 represents the region in which the total components of matrix material and retroreflective microspheres exceeds 100% of solid material, and therefore precludes the addition of any liquid component to produce a retroreflective composition with a volatile constituent. The volatile constituent is necessary to facilitate the application of the retroreflective composition to a substrate to achieve a semi-saturated microspheric density of between 2,000 and 20,000.

Area B of FIG. 6 represents the region in which there in an insufficient quantity of matrix material to adhere the retroreflective microsphere beads and pigment particles to the substrate. Thus, with the insufficient quantity of matrix material, the fabrics upon which the matrix material, retroreflective microsphere beads and pigment particles are applied fail to satisfy industry crock and laundering standards.

Area C of FIG. 6 represents the region in which there is an excess quantity of matrix material as compared to the quantity of retroreflective microsphere beads resulting in a heavier deposit on the substrate causing the fabrics upon which the matrix material, retroreflective microsphere beads and pigment particles are applied to fail to satisfy industry hand standards.

Area D of FIG. 6 represents the region in which there is greater than 20,000 retroreflective microsphere beads per centimeter (i.e. a semi-saturated microspheric density greater than 20,000). The fabrics upon which the matrix material, pigment particles and this abundance of retroreflective microsphere beads are applied exhibit primarily the appearance of the retroreflective coating on the microsphere beads as opposed to the pigment particles during the daytime.

Area E of FIG. 6 represents the region in which there is less than 2,000 retroreflective microsphere beads per centimeter (i.e. a semi-saturated microspheric density less than 2,000). The fabrics upon which the matrix material, pigment particles and this scarce amount of retroreflective microsphere beads are applied does not exhibit sufficient retroreflective qualities to be visible under low beam conditions at nighttime.

Figure 7:
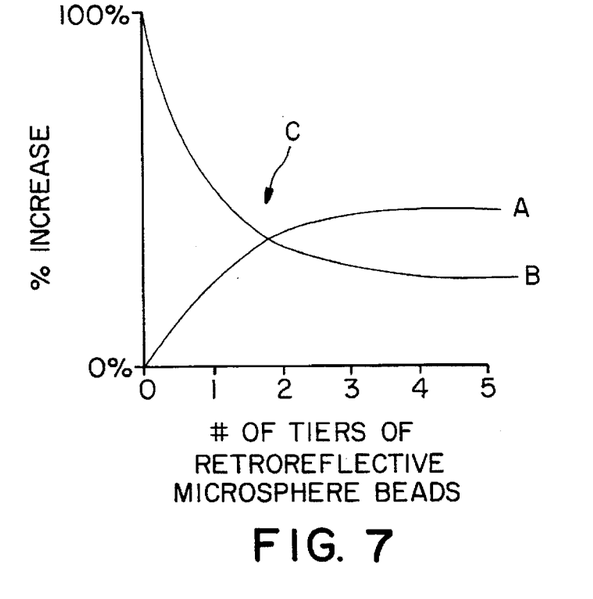
FIG. 7 is a graph depicting the percent increase in retroreflectivity and daytime unnoticeability resulting from multi-tiered microsphere beads.

FIG. 7 is a graph which projects the percentage increase of retroreflectivity and percentage decrease in daytime unnoticeability obtained by treating a woven fabric. As shown in FIG. 7, both nighttime reflectivity as depicted by Line A and daytime unnoticeability as depicted by Line B exhibit diminishing returns when the retroreflective microsphere beads form more than 3 layers. The area C identified in FIG. 7, shows that the highest levels of both retroreflectivity and daytime unnoticeability are achieved when the retroreflective microsphere beads are deposited in 2–3 tiers. In a nylon fabric, when retroreflective microsphere beads are deposited onto the fabric, the retroreflective microsphere beads form in tiers of 2–3 layers over approximately 30% of the fabric to achieve a semi-saturated microspheric density of between 5,000 and 12,000.

Further, the deposition of microsphere beads in 2–3 layers increases the angularity of nighttime reflectivity. Specifically, because of the random orientation and multiple layering of the microsphere beads, there are more retroreflective microsphere beads located at higher elevations on the fabric and at different orientations that are available to reflect light which strikes the coated fabric, even at such angles as 135°. This is especially beneficial when children, pedestrians, or bicyclists approach the road perpendicular to the direction the automobile is traveling.

The invention will be further described with the following non-limiting examples. A slurry was prepared from the following ingredients:

|  | Parts by Volume | |
|---|---|---|
|  | volatile | non-volatile |
| 1. Water | 63.80 |  |
| 2. Ammonium Hydroxide to prevent premature cross-compositioning (A.C.S. reagent 35% solids from Aldrich) | .25 | .14 |
| 3. Matrix Material Acrylic Copolymer (Altoma Low Crock #1082, 100% solid from Bolger & O'Hearn) |  | 16.73 |
| 4. Softener to aid in hand of substrate Polydimethylsiloxane mixture (Acramin Softener SID 80% solids from MILES) | .14 | .56 |
| 5. Dispersant to aid in suspending particles. Acrylic Polymer. (Alcosperse AD 40% solids from Hydrolabs) | .84 | .24 |
| 6. Thickener to maintain the proper viscosity. Acrylic Polymer (AlcoPrint PTF 55% solids from Hydrolabs) | .63 | .61 |
| 7. Fixer to enhance cross-compositioning Methylated Melamine Formaldehyde (Aricel PC-6A 79% solids from Astro Industries) | .15 | .42 |
| 8. Pigment particles with diameters averaging less than 2 microns Pigment cake, 100% solid |  | 3.55 |
| 9. Silane coated onto microspheres Gamma-aminopropyltriethoxysilane (A1100, 75% solids from OSI) | .05 | .16 |
| 10. Hemispherically Reflective Dry AL Glass Beads of 1.9 refractive index averaging 50 microns |  | 11.73 |
| Total | 65.86 | 34.14 |

The first seven of the above-identified ingredients were mixed together for 15 minutes with a high speed mixing blade. After mixing to homogeneity, the pigment particles and retroreflective microsphere beads were added and mixed for 5 minutes until uniformly blended. The retroreflective composition is then applied as a single component onto a fabric using a rotary screen printer directly against the fabric resulting in a retroreflective fabric coated with between 2,000 to 20,000 randomly oriented microsphere beads per square centimeter fabric. Following the application of the particles to a fabric, the composition was dried by forced air heated between 100° F. to 200° F. for approximately 1–3 minutes and then cured at 350° F. for 2 minutes. As a result, the volume ratio of the matrix material to the retroreflective microsphere beads plus pigment is approximately 110%.

Compositions of the present invention can be applied to fabric using conventional textile printing and finishing equipment. Typical methods include rotary screen printing, rotogravure cylinder, blade over roll, bathing, spraying, and flat bed printing. The typical commercial finishes such as softeners, waterproofing, and water repellency may be applied over the printed composition of the present invention without affecting the retroreflective composition's daytime unnoticeability or nighttime reflectivity.

While the invention has been particularly shown and described with reference to particular embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A retroreflective composition comprising:
   a non-volatile matrix material;
   a volatile constituent;
   a plurality of retroreflective microsphere beads; and
   a quantity of pigment particles having a diameter of not greater than 2 microns; said quantity of pigment particles being sufficient to enable a substrate to which the composition has been applied to reflect color from the pigment particles under daytime conditions;
   wherein the volume of said matrix material to the volume of said retroreflective microsphere beads plus said pigment particles is in the range of 50% to 185%.

2. The composition according to claim 1 wherein upon application of the composition to a substrate, the composition contains retroreflective microsphere beads to yield a semi-saturated microspheric density of between 2,000 and 20,000 per square centimeter of substrate.

3. The composition according to claim 1, wherein said volume of the matrix material to the volume of retroreflective microsphere beads plus pigment particles is approximately 100%.

4. The composition according to claim 1, wherein the volume of said matrix material to the volume of said retroreflective microsphere beads is in the range of 75% to 185%.

5. A fabric which has the appearance of being more retroreflective at night when exposed to a beam of light than when exposed to diffuse light, the fabric having applied on at least a portion of a surface thereof a coating layer, said coating layer comprising:
   a non-volatile matrix material;
   a volatile constituent;
   a plurality of retroreflective microsphere beads; and,
   a quantity of pigment particles having a diameter of not greater than 2 microns; said quantity of pigment particles being sufficient to enable said fabric to reflect color from the pigment particles under daytime conditions;
   wherein the volume of said matrix material to the volume of said retroreflective microsphere beads plus said pigment particles is in the range of 50% to 185%.

6. The fabric according to claim 5, wherein the coating layer further comprises retroreflective microsphere beads to yield a semi-saturated microspheric density of between 2,000 and 20,000 per square centimeter of the fabric.

7. The fabric according to claim 5 wherein the fabric is a garment.

8. The garment according to claim 7 wherein the garment is a shoelace.

9. The fabric according to claim 5, wherein the coating layer is applied to the entire surface of the fabric to form a silhouette when viewed under focused rays of light.

* * * * *